W. A. RAY.
PUNCTURE PROOF INNER LINING FOR PNEUMATIC TIRES.
APPLICATION FILED MAY 27, 1912.

1,097,820. Patented May 26, 1914.

Witnesses
L. B. James
C. E. Hunt

Inventor
W. A. Ray
By H. B. Willson & Co.
Attorneys

UNITED STATES PATENT OFFICE.

WILLIAM A. RAY, OF JACKSON, OHIO.

PUNCTURE-PROOF INNER LINING FOR PNEUMATIC TIRES.

1,097,820. Specification of Letters Patent. Patented May 26, 1914.

Application filed May 27, 1912. Serial No. 699,997.

*To all whom it may concern:*

Be it known that I, WILLIAM A. RAY, a citizen of the United States, residing at Jackson, in the county of Jackson and State of Ohio, have invented certain new and useful Improvements in Puncture-Proof Inner Linings for Pneumatic Tires; and I do declare the following to be a full, clear, and exact description of the invention, such as will enable others skilled in the art to which it appertains to make and use the same.

This invention relates to improvements in puncture proof inner linings for pneumatic tires.

One object of the invention is to provide a lining of this character which will positively protect the inner tube of the tire from injury without affecting the resiliency of the tire and which will automatically expand under pressure from the inner tube when inflated, and contract under pressure brought to bear on the outer tube or casing from the weight of a vehicle.

Another object is to provide an inner lining of this character which is of substantially double arch construction thereby possessing great strength and power to resist undue pressure from within or without.

A further object is to provide a lining for pneumatic tires which will be simple, durable and inexpensive in construction, light in weight, easy to manufacture, efficient and reliable in operation and which may be readily inserted in and removed from the outer tube or casing of the tire.

With these and other objects in view, the invention consists of certain novel features of construction, and the combination and arrangement of parts as will be more fully described and claimed.

Figure 1:
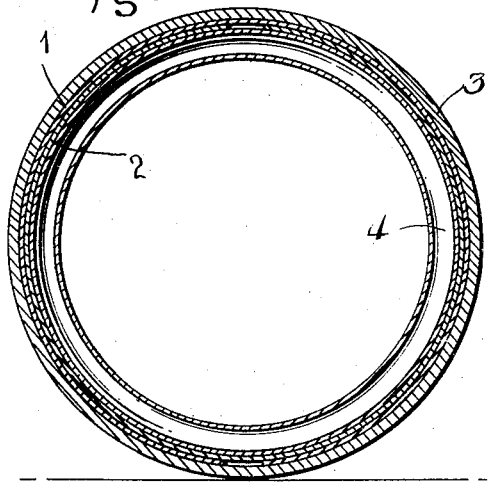
Figure 2:
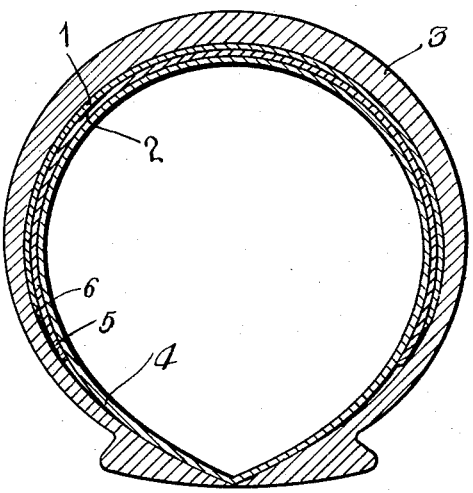
Figure 3:
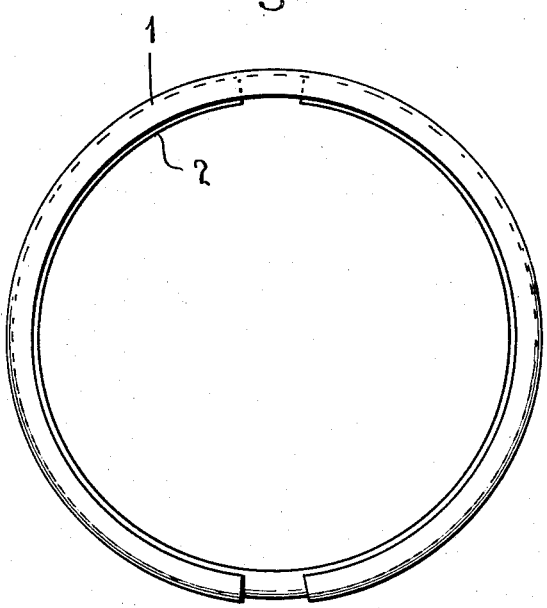
Figure 4:
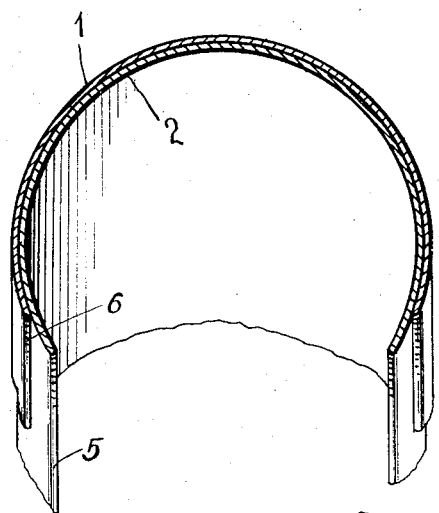

In the accompanying drawings; Figure 1 is a longitudinal section of a pneumatic tire having my improved lining applied thereto; Fig. 2 is a cross section of the same; Fig. 3 is a side view of the lining removed from the tire; Fig. 4 is a cross section of the same.

My improved tire lining comprises an outer member 1 and an inner member 2, each of which is a split ring whose ends come nearly but not quite into contact with each other. The inner member is arranged in said outer member in such position that said members will break joint that is to say, the splits or open space between the ends of one of said members will be covered by the body of the other member as clearly shown in Fig. 3 of the drawings.

The members 1 and 2 of my improved lining are preferably formed of galvanized spring steel plates, bent by a suitable press or dies to conform substantially to the cross sectional shape of the outer tire or casing 3 with which they are to be employed. The transverse diameter and the longitudinal diameter of the inner member of the lining is slightly less than that of the outer member so that said inner member will readily fit within the outer member as shown. The members 1 and 2 are of substantially circular shape and the ends of the same terminate a sufficient distance apart to permit the members to contract under pressure applied to the outer tube or casing, so that the resiliency or spring action of the tire is not interfered with.

The width of the members 1 and 2 is such that said members extend about two-thirds of the distance around the inner tube 4, which is sufficient to protect the outer portions of the same such as are liable to become punctured but is not sufficient to interfere with the inflation of the inner tube. It will be noted that the edges 5 of the inner member project a slight distance beyond the edges 6 of the outer member so that the several edges will bear against the curved inner surface of the outer tube or casing 3 at various points as seen in Fig. 2. When now pressure is thrown onto the tread of the wheel the ring-shaped members are compressed so that they are reduced slightly, both longitudinally and transversely. The ends of the inner member 2 where it is split approach each other and slide inside the outer member 1 and outside the tube 4, while the ends of the outer member 1 also approach each other and slide outside the inner member 2 and inside the casing 3. Transversely the reduction in size occurs only at a point opposite the tread of the wheel, and in doing so the edges 6 of the outer member 1 slide toward the rim between the inner member 2 and the casing 3, and the edges 5 of the inner member 2 slide toward said rim between the casing and the tube. During this action the resiliency or expansive tendency of the steel rings causes their ends and edges to bear against the members next outside them with more force than against the members next inside of them, and this tendency is enhanced by the air pressure within the tube which pressure is of course increased by the weight of the load. The result is that the wear upon the casing is very little and that upon the tube is extremely little, practically nothing.

In inserting a liner of this character in an ordinary automobile tire, the liner is first placed within the casing, then the tube is placed within the liner and the whole put on the wheel, and finally the tube is inflated as usual. The exact manner in which the liner is put into the casing will depend to an extent upon the size of the wheel, the thickness and width of the members 1 and 2, and the strength of the operator or the tools employed by him if any. He may open out the casing, compress the outer member slightly both longitudinally and laterally, and slip it into the casing; subsequently compressing the inner member longitudinally and laterally and inserting it into the outer member. Or he may first put the inner member into the outer and then compress them both and put them into the casing. I would prefer the first-named process. It is obvious that this liner can be employed with almost any type of automobile tire, and if made in proper sizes to fit the various sizes of tires the "splits" between the ends of the rings or members 1 and 2 will automatically open only to about the extent illustrated in Fig. 3. While this view shows said splits as diametrically opposite, it is only desirable that they be out of register so as to "break joint" with each other as above described.

By constructing the lining in two sections arranged one within the other as herein shown and described a practically double arched armor is provided which will effectually resist undue pressure or strain which may be brought against the same and except for the two short spaces between the ends of the members a double sheet metal protection is afforded to the inner tube which may turn any pins or tacks, nails or similar objects which may puncture or pass through the outer tube or casing thereby preventing such objects from penetrating or injuring the inner tube.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. The herein described liner for pneumatic tires, the same comprising a metallic split ring of arched cross section disposed between the casing and tube and of a size to have its ends out of contact when the tube is inflated, and a second similar and slightly smaller split ring disposed next inside the first-mentioned ring and with its split out of register with that in the same.

2. The herein described liner for pneumatic tires, the same comprising a split ring of resilient strip metal having its ends out of contact with each other, the strip being curved transversely into approximately semi-circular form; and a second similar and slightly smaller split ring slidably mounted within the first-named ring with its split breaking joint with the split therein, said second strip being also curved transversely but of slightly greater width than the first-named strip so that its edges project beyond the same, the whole for insertion between the tire casing and tube.

In testimony whereof I have hereunto set my hand in presence of two subscribing witnesses.

WILLIAM A. RAY.

Witnesses:
 HUGH B. SULLIVAN,
 W. E. PATTEN.